(12) United States Patent
Archer (10) Patent No.: US 10,306,058 B2
(45) Date of Patent: May 28, 2019

(54) METHODS, TELECOMMUNICATION SWITCHES AND COMPUTER PROGRAMS FOR PROCESSING CALL SETUP SIGNALLING

(71) Applicant: Metaswitch Networks Ltd., Enfield (GB)

(72) Inventor: Duncan Archer, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 0 days.

(21) Appl. No.: 16/114,044

(22) Filed: Aug. 27, 2018

(65) Prior Publication Data

US 2019/0068783 A1 Feb. 28, 2019

(30) Foreign Application Priority Data

Aug. 31, 2017 (GB) .................................. 1713989.0

(51) Int. Cl.
*H04M 3/436* (2006.01)
*H04M 3/54* (2006.01)
*H04M 3/42* (2006.01)

(52) U.S. Cl.
CPC ..... *H04M 3/4365* (2013.01); *H04M 3/42042* (2013.01); *H04M 3/541* (2013.01)

(58) Field of Classification Search
CPC ............... H04M 3/436; H04M 3/4365; H04M 3/42042; H04M 3/541; H04L 63/08; H04L 63/105; H04L 65/1069; H04W 4/16; H04W 88/18

See application file for complete search history.

(56) References Cited

U.S. PATENT DOCUMENTS

| | | | |
|---|---|---|---|
| 7,360,090 B1* | 4/2008 | Doskow | H04L 63/08 |
| | | | 713/170 |
| 2005/0207552 A1* | 9/2005 | Bodnar | G06Q 10/063 |
| | | | 379/201.01 |

FOREIGN PATENT DOCUMENTS

| | | | | |
|---|---|---|---|---|
| WO | 2008082489 A1 | 7/2008 | | |
| WO | WO-2008082489 A1 * | 7/2008 | | H04M 3/229 |

OTHER PUBLICATIONS

Wendt et al: "Personal Assertion Token (PASSporT)" IETF, STIR Internet-Draft, Feb. 9, 2017.

(Continued)

*Primary Examiner* — George Eng
*Assistant Examiner* — Jing Gao
(74) *Attorney, Agent, or Firm* — EIP US LLP (57) ABSTRACT

A method of processing call setup signalling at a telecommunications switch. The telecommunications switch receives call setup signalling, comprising at least a caller ID. The telecommunications switch is connected via a plurality of trunks which connect the telecommunications switch to two or more other telecommunications switches capable of transmitting call setup signalling to the telecommunications switch. The telecommunications switch detects at least one of the plurality of trunks via which the call setup signalling has arrived at said telecommunications switch. The telecommunications switch determines a call handling option to be applied to the incoming call setup signalling based at least in part on the detecting and the caller ID.

14 Claims, 4 Drawing Sheets

(56) References Cited

OTHER PUBLICATIONS

Peterson et al: "Authenticated Identity Management in the Session Initiation Protocol (SIP)" IETF, Network Working Group Internet-Draft, Feb. 9, 2017.
Peterson et al: "Secure Telephone Identity Credentials: Certificates" IETF, Network Working Group Internet-Draft, Dec. 18, 2017.
ATIS-1000074 Joint ATIS/SIP Forum Standard—Signature-based Handling of Asserted information using toKENs (Shaken); Alliance for Telecommunications Industry Solutions, 2017.
Robocall Strike Force Report, Oct. 26, 2016.
Wendt, Chris: "Stir and Shaken Framework Overview" IIT Real-Time Conference 2016.
GB Combined Search and Examination Report dated Sep. 29, 2017 for GB Application No. GB1713989.0.

\* cited by examiner

| Calling party | Trunking information | |
|---|---|---|
| 101 | White list | 503 |
| | Black list | 501 |
| | Grey list | 507 |

METHODS, TELECOMMUNICATION SWITCHES AND COMPUTER PROGRAMS FOR PROCESSING CALL SETUP SIGNALLING

CROSS-REFERENCE TO RELATED APPLICATIONS

This application claims the benefit under 35 U.S.C. § 119(a) and 37 CFR § 1.55 to UK patent application no. 1713989.0, filed on Aug. 31, 2017, the entire content of which is incorporated herein by reference.

BACKGROUND OF THE INVENTION

Field of the Invention

The present disclosure relates to processing of call setup signalling. In particular, but not exclusively, it relates to methods, computer programs and telecommunication switches usable in processing call setup signalling.

Description of the Related Technology

In a telecommunications network, caller ID (also referred to as caller identification) is an identifier, such as a phone number, associated with a calling party and is provided to a called party equipment as part of call setup signalling. Caller ID may be displayed on the called party's equipment for use in identifying calling party.

The volume of unsolicited and unwanted telephone calls (also referred to as nuisance calls), has increased dramatically in recent years with the advent of computer aided robocallers, which are able to call lots of telephone subscribers in a short period of time. The annoyance caused by nuisance calls has prompted telephone operators, either independently and/or in conjunction with third parties, to maintain a list of phone numbers (also referred to as a blacklist of phone numbers) associated with robocallers, and to block calls from the phone numbers on this list.

Robocallers get around this list by manipulating their caller ID, which is a practice of causing a call to appear to have come from a caller ID different to the one associated therewith. There are both legitimate and illegitimate reasons for caller ID manipulation. Illegitimate use of caller ID manipulation is also referred to as caller ID spoofing. An example of a legitimate reason for manipulating caller ID information is causing all outgoing calls from various terminals in a large company to be identified on the basis of a primary identifier associated with the company. In another example, a call centre making calls on behalf of a client may prefer the calls to appear as though they have been made by the client, rather than the call centre. An example of illegitimate use includes manipulating a caller ID in order to impersonate another entity, such as a bank, so as to mislead a called party and to acquire sensitive information therefrom through deception.

This being the case, if a robocaller manipulates their calls to appear to have come from a reputable organisation, then they are likely to cause the caller ID associated with the reputable organisation to be blacklisted, which will, at least temporarily, prevent genuine use of the caller ID. The blacklisting of a caller ID associated with a reputable organisation may, for example, be based on one or more factors, such as persistent illegitimate use by a robocaller of a caller ID associated with a reputable organisation. Therefore, the practice of blocking calls based on the blacklist may inadvertently block genuine calls, which is undesirable.

The "Secure Telephone Identity Revisited" (STIR) Working Group of the IETF standardisation organisation has defined generic industry standards that allow verification of the calling party's authorization to use a caller ID. In addition, Alliance for Telecommunications Industry Solutions (ATIS) and SIP Forum IP-NNI (IP Network-Network Interface) taskforce have developed a "Signature-based Handling of Asserted information using toKENs" (SHAKEN) framework to address the shortcomings of the blacklist approach. Specifically, the SHAKEN framework provides for end-to-end cryptographic verification and authentication of caller IDs on the basis of a digital signature added to call setup signalling by a carrier network to validate the caller ID and/or identify an entry point (also referred to as origination point) of a call in its network. However, the framework is complex and relies on carriers' ability to add a digital signature to call setup signalling. As implementing the framework is not currently a legal requirement, it is inevitable that the framework will not be implemented by all of the carriers.

In known systems, a telecommunications network equipment is configured to add data identifying an origination point associated with call setup signalling for use in validating caller ID information. As all telecommunication networks, particularly legacy telecommunication networks, are not configured to include information identifying the origination point, these systems are not efficient in preventing nuisance calls. In addition, these systems are also dependent on the ability of telecommunication switches along a signalling route traversed to be able to transmit data identifying the origination point. Therefore, these systems also suffer from the problems associated with the SHAKEN framework, wherein telecommunication networks are not under any obligation to add and transmit data identifying an origination point associated with call setup signalling.

Therefore, an improved mechanism for identification of unsolicited and unwanted telephone calls, which is not dependent on the capability of other networks, is desirable.

SUMMARY

In a first exemplary embodiment, there is provided a method of processing call setup signalling at a telecommunications switch, the method comprising:
  receiving at said telecommunications switch call setup signalling, comprising at least a caller ID, said telecommunications switch being connected via a plurality of trunks which connect the telecommunications switch to two or more other telecommunications switches capable of transmitting call setup signalling to said telecommunications switch;
  detecting at least one of the plurality of trunks via which the call setup signalling has arrived at said telecommunications switch; and
  determining a call handling option to be applied to the incoming call setup signalling based at least in part on the detecting and the caller ID.

In a second exemplary embodiment, there is provided a telecommunications switch comprising:
  at least one processor; and
  at least one memory including computer program code;
  the at least one memory and the computer program code being configured to, with the at least one processor, cause the telecommunications switch to:telecommunications switch operable to process call setup signalling, the telecommunications switch being configured to:

receive call setup signalling, comprising at least a caller ID, said telecommunications switch being connected via a plurality of trunks which connect the telecommunications switch to two or more other telecommunications switches capable of transmitting call setup signalling to said telecommunications switch;

detect at least one of the plurality of trunks via which the call setup signalling has arrived at said telecommunications switch; and determine a call handling option to be applied to the incoming call setup signalling based at least in part on the detecting and the caller ID.

In a third exemplary embodiment, there is provided a non-transitory computer-readable storage medium comprising a set of computer-readable instructions stored thereon, which, when executed by a processing system, cause the processing system to carry out a method of processing call setup signalling at a telecommunications switch, the method comprising, at the processing system:computer program comprising a set of instructions, which, when executed by a computerised device, cause the computerised device to perform a method of processing call setup signalling at a telecommunications switch, the method comprising, at the computerised device:

receiving at said telecommunications switch call setup signalling, comprising at least a caller ID, said telecommunications switch being connected via a plurality of trunks which connect the telecommunications switch to two or more other telecommunications switches capable of transmitting call setup signalling to said telecommunications switch;

detecting at least one of the plurality of trunks via which the call setup signalling has arrived at said telecommunications switch; and determining a call handling option to be applied to the incoming call setup signalling based at least in part on the detecting and the caller ID.

Further features and advantages of the disclosure will become apparent from the following description of preferred embodiments, given by way of example only, which is made with reference to the accompanying drawings.

DETAILED DESCRIPTION OF CERTAIN INVENTIVE EMBODIMENTS

Figure 1:
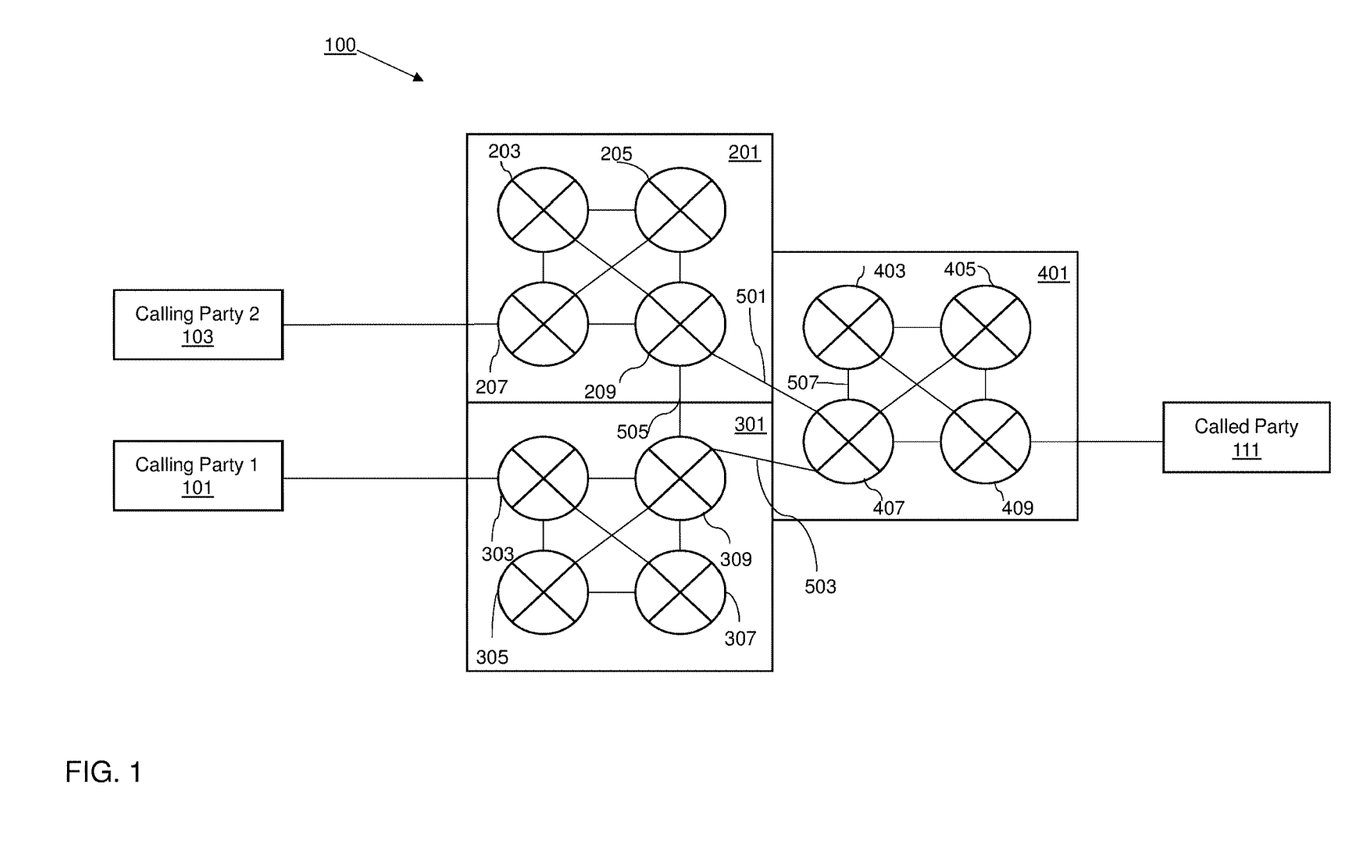
FIG. 1 shows a schematic block diagram of an example of a telecommunications network in accordance with embodiments.

Referring to FIG. 1, there is shown schematically an example of a telecommunications network 100 comprising a framework for providing telephony services. The telecommunications network 100 comprises a number of systems. The term "system" is used herein to denote an entity (or entities) in the telecommunications network 100. A system may be embodied in the form of apparatus, hardware, software, a function, a virtualized resource, etc.

In this example, the telecommunications network 100 comprises a calling party 101 (denoted as "Calling Party 1" in FIG. 1), a calling party 103 (denoted as "Calling Party 2" in FIG. 1), a called party 111, and carrier networks 201, 301 and 401. A telecommunications network can comprise at least some different and/or additional components to those shown in FIG. 1.

The calling party 101, the calling party 103 and the called party 111 are connected to the telecommunications network 100 via the carrier networks 201, 301 and 401 (as appropriate). In this example, the calling party 101 has a direct relationship with the carrier network 301 and the calling party 103 has a direct relationship with the carrier network 201, but the calling parties 101 and 103 do not have a direct relationship with the carrier network 401.

Each of the calling party 101, the calling party 103 and the called party 111 comprise an endpoint device, for example a Session Initiation Protocol (SIP) telephone, a mobile telephone, a tablet computer, a personal computer, a landline telephony equipment, an automated dialler operable on, for example, a personal computer, etc. Each of the calling party 101, the calling party 103 and the called party 111 may comprise one or more processors (not shown) for performing various data processing operations according to embodiments and/or one or more memories (not shown) for storing various data according to embodiments.

The carrier networks 201, 301 and 401 are communicatively coupled with each other, and the calling party 101, the calling party 103 and the called party 111. Communicative coupling between the carrier networks 201, 301 and 401, and the calling party 101, the calling party 103 and the called party 111 may be via a wired or a wireless access network (not shown). An example of a wired access network is a public switched telephone network, and an example of a wireless access network may be an Evolved Universal Terrestrial Radio Access Network (E-UTRAN). The access network(s) may comprise a number of systems, such as an exchange for providing endpoint connectivity to the calling party 101, the calling party 103 and the called party 111.

Each of the carrier networks 201, 301 and 401 comprise a number of systems. In this example, the carrier network 201 comprise telecommunications switches 203, 205, 207 and 209, the carrier network 301 comprise telecommunications switches 303, 305, 307 and 309, and the carrier network 401 comprise telecommunications switches 403, 405, 407 and 409.

The telecommunication switches 203, 205, 207, 209, 303, 305, 307, 309, 403, 405, 407 and 409 are each capable of transmitting call setup signalling between communication endpoints, such as the calling party 101, the calling party 103 and the called party 111. The telecommunication switches 203, 205, 207, 209, 303, 305, 307, 309, 403, 405, 407 and 409 are communicatively coupled with at least one network system, such as a telecommunications switch or a gateway, internal or external to the carrier networks 201, 301 and 401 (as appropriate). Communicative coupling between the telecommunication switches 203, 205, 207, 209, 303, 305, 307, 309, 403, 405, 407 and 409 may be via a plurality of trunks, wherein communicative coupling between telecommunication switches may be via one or more trunk circuits, which in turn may belong to one or more trunk groups. In this example, the telecommunication switches 203, 205, 207 and 209 are communicatively coupled with each other, the telecommunication switches 303, 305, 307 and 309 are communicatively coupled with each other, and the telecommunication switches 403, 405, 407 and 409 are communicatively coupled with each other. The telecommunication switch 209 is communicatively coupled with the telecommunication switch 309 via a trunk group 505 and with the telecommunication switch 407 via a trunk group 501, and the telecommunication switch 407 is communicatively coupled to the telecommunication switch 309 via trunk group 503 and with the telecommunication switch 403 via a trunk group 507.

The telecommunication switches 203, 205, 207, 209, 303, 305, 307, 309, 403, 405, 407 and/or 409 comprise one or more processors (not shown) for performing various data processing operations according to embodiments. The telecommunication switches 203, 205, 207, 209, 303, 305, 307, 309, 403, 405, 407 and/or 409 comprise or otherwise have access to a database (not shown) for storing various data according to embodiments. The database may comprise one or more memories (not shown) and may be integral to or external to the telecommunication switches 203, 205, 207, 209, 303, 305, 307, 309, 403, 405, 407 and/or 409. The database may comprise memory within the telecommunication switches 203, 205, 207, 209, 303, 305, 307, 309, 403, 405, 407 and/or 409 (not shown) which is available for storing call setup processing data. The memory may be volatile so that data stored therein may need to be re-learnt upon failure/re-boot of the telecommunication switches 203, 205, 207, 209, 303, 305, 307, 309, 403, 405, 407 and/or 409.

Figure 2:
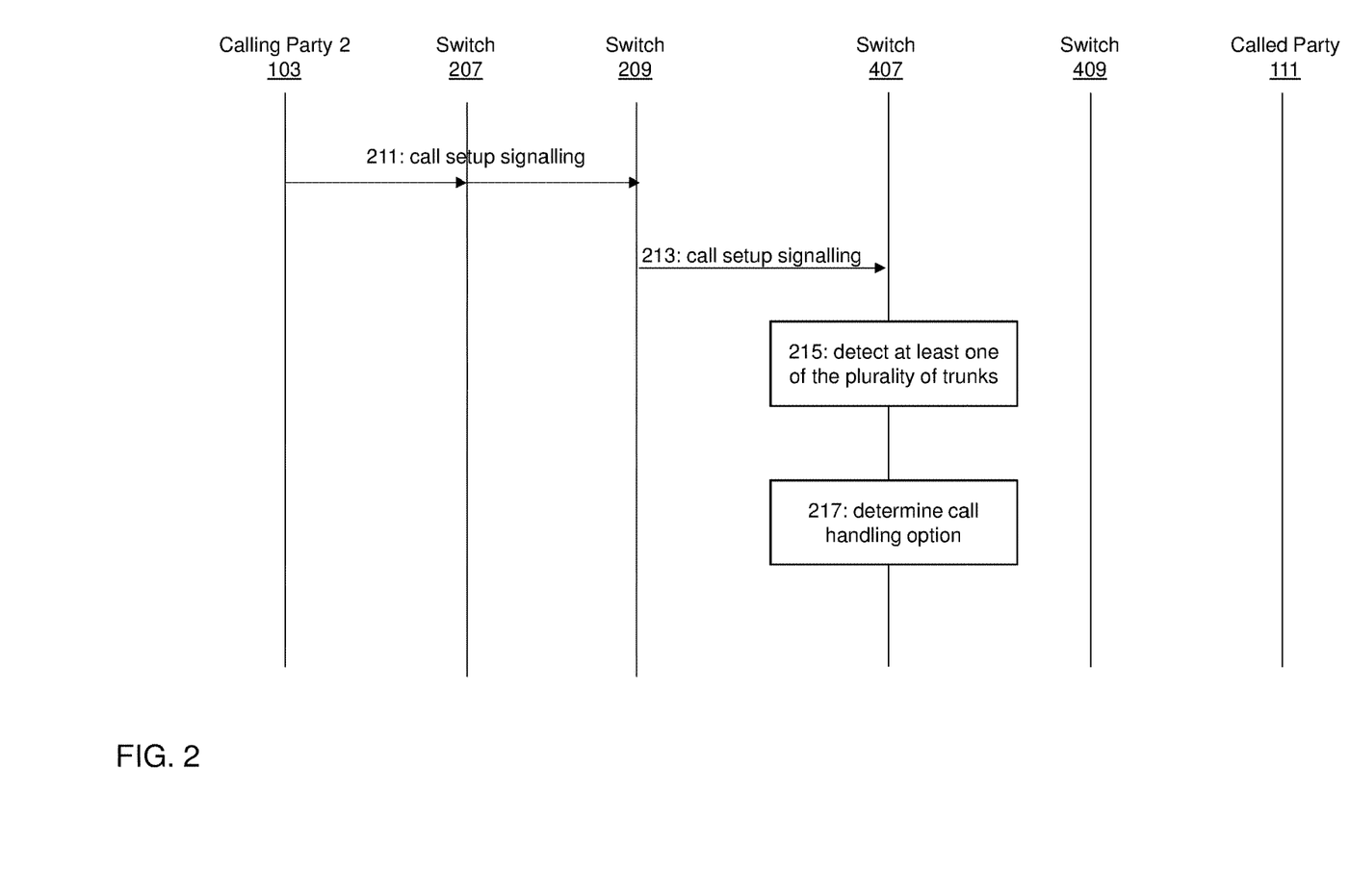
FIG. 2 shows a flow diagram depicting an example of processing of data in accordance with embodiments.

Referring to FIG. 2, there is shown an example of handling of call setup signalling originating at the calling party 103. The call setup signalling comprises at least a caller ID. This example is performed in the telecommunications network 100 described above with reference to FIG. 1.

The calling party 103 initiates a call setup by transmitting call setup signalling via the carrier network 201. The call setup signalling is received by the telecommunications switch 209 via the telecommunications switch 207 (item 211), which may then decide where to route it on the basis of a called party identifier. In this example, the telecommunications switch 209 routes the call setup signalling via the trunking group 501 for receipt by the telecommunications switch 407 (item 213).

The telecommunications switch 407 detects at least one of the trunks 501, 503 and/or 507, via which the call setup signalling has arrived at the telecommunications switch 407 (item 215). In this example, the detected trunk indicates the call setup signalling was received via the trunk group 501, which in turn implies that the call setup signalling either originated at or was routed via the carrier network 201. The telecommunications switch 407 determines at least a part of signalling route traversed by the call setup signalling on the basis of the detected trunk in order to establish whether or not the route traversed could be considered appropriate or reasonable for calls originating at the caller ID included in the call setup signalling. The caller ID included in the call setup signalling may correspond to the calling party 103, in which case the route traversed is likely to be considered appropriate. Alternatively, the caller ID may have been manipulated so as to make the call setup signalling appear as if it originated from, for example, the calling party 101, and in this case: the route traversed may be considered appropriate if the calling party 103 is allowed to impersonate the calling party 101; the route traversed may not be considered appropriate if the calling party 103 is not allowed to impersonate the calling party 101; or an association between the route traversed and the caller ID may not be known and accordingly a determination regarding appropriateness thereof may not be ascertainable.

The telecommunications switch 407 determines a call handling option to be applied to the incoming call setup signalling based at least in part on the detecting at item 215 and the caller ID (item 217). The call handling option may, for example, include blocking the call setup signalling if the route traversed is not considered to be appropriate.

Therefore, the telecommunications switch 407 is enabled to determine call handling options based on the detected trunk. The embodiments do not rely on a digital signature inserted by a carrier network involved in routing the call setup signalling, such as the carrier network 201. Accordingly, the embodiments are not dependant on the capability of other carrier networks to include the digital signature for determining whether call setup signalling relates to nuisance calls.

In embodiments, the received call setup signalling does not include data indicative of the detected trunk. In this case, the at least one of the trunks 501, 503 and/or 507, via which the call setup signalling has arrived at said telecommunications switch at item 213, is detected independently of data included in the call setup signalling. Therefore, the telecommunications switch 407 detects the trunk independently of, for example, data indicative of a route traversed included in the call setup signalling. This being the case, the call handling option is determined independently of, for example, misleading or inaccurate information regarding the route traversed inserted in the call setup signalling.

In embodiments, the detected at least one trunk of the trunks 501, 503 and/or 507, via which the call setup signalling has arrived at said telecommunications switch at item 213, comprises a trunk circuit or a trunk group, for example the trunk groups 501, 503 or 507.

In at least some embodiments, the telecommunications switch 407 and/or a node (not shown) in the carrier network 401 may maintain an association in a database (not shown) between the caller ID and at least one of the trunks 501, 503 and 507. The database may be integral or external to the telecommunications switch 407 and/or the node. An example of entries in the database defining the associations is shown with reference to FIG. 3. In this example, the caller ID included in the call setup signalling corresponds to the calling party 101.

Figure 3:
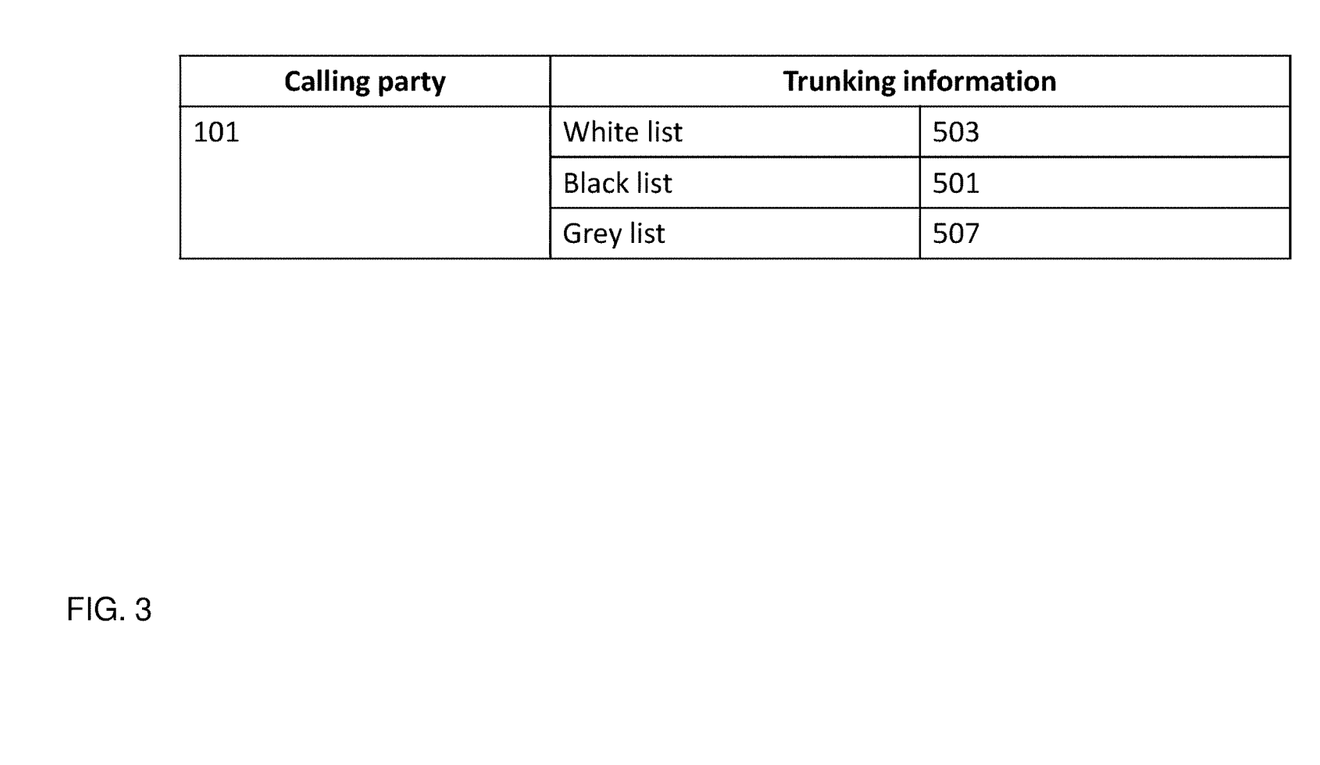
FIG. 3 shows a table depicting an example of entries in a database in accordance with embodiments.

The telecommunications switch 407 and/or the node maintain, in the database, a first association between the caller ID and a first set comprising data indicative of at least one of the trunks 501, 503 and 507. The trunk(s) associated with the first set being indicative of at least one signalling route that signalling originating from the caller ID associated with the calling party 101 can traverse (also referred to as "White list"). In this example, the telecommunications switch 407 has knowledge that the trunking group 503 corresponds to a legitimate route for signalling information originating at the caller ID corresponding to the calling party 101.

There could be more than one legitimate signalling routes for, for example, the caller ID corresponding to the calling party 101. This could be, for example, because of routing policies implemented in the carrier network 201 and/or because of traffic conditions being experienced in the carrier network 201. Accordingly, the telecommunications switch 209 may, for example, transmit the call setup signalling via a telecommunications switch associated with a different carrier network.

The telecommunications switch 407 and/or the node may add trunking information corresponding to one or more legitimate signalling routes for calls originating at the caller ID corresponding to the calling party 101. These routes could, for example, be indicative of signalling route(s) corresponding to calls originating at calling parties that legitimately manipulate the caller ID corresponding to the calling party 101, and/or signalling route(s) that an originating carrier network, the carrier network 301 in this case, or an intermediate carrier network (not shown) route call setup signalling originating at the calling party 101.

The telecommunications switch 407 detects the call handling option based at least in part on the first association. As described above, the detected trunk, via which the call setup signalling has arrived at the telecommunications switch 407 at item 213, in this case is indicative of the trunk group 501, but the detected trunk does not correspond to any of the entries in the white list associated with the caller ID. Therefore, in this case, the telecommunications switch 407 may block the call setup signalling, thereby preventing a call based on the call setup signalling from being established.

The telecommunications switch 407 and/or the node may additionally maintain, in the database, a second association between the caller ID and a second set comprising data indicative of at least one trunk, different to the trunk(s) in the white list. The trunk(s) associated with the second set correspond to at least one signalling route that call setup signalling originating at the caller ID associated with the calling party 101 could not have traversed (also referred to as "Blacklist"). In this example, the telecommunications switch 407 has knowledge that the trunking group 501 corresponds to an illegitimate route for signalling information originating at the caller ID corresponding to the calling party.

The telecommunications switch 407 detects the call handling option based at least in part on the second association. As described above, the detected trunk, via which the call setup signalling has arrived at the telecommunications switch 407 at item 213, in this case is indicative of the trunk group 501, which corresponds to an entry in the blacklist associated with the caller ID. Therefore, the telecommunications switch 407 may, for example, block the call setup signalling whereby preventing a call based on the call setup signalling from being established.

In the event that the detected trunk, via which the call setup signalling has arrived at the telecommunications switch 407 at item 213, does not correspond to any of the trunk(s) in the white list or the blacklist, the telecommunications switch 407 may monitor signalling involving the caller ID associated with the calling party 101 to determine if an association between the detected trunk, via which the call setup signalling has arrived at the telecommunications switch 407, and the caller ID should be maintained in the white list or the blacklist. The telecommunications switch 407 and/or the node may maintain trunking information corresponding to signalling routes that have not been included in the white list or the blacklist in a third set (also referred to as "Grey list"). In this example, the trunk group 507 is included in the grey list to indicate that call signalling information for the caller ID corresponding to the calling party 101 has been received via the trunk group 507, but no determination has been reached whether the trunk group 507 corresponds to a legitimate or an illegitimate signalling route for signalling involving the caller ID corresponding to the calling party 101.

In at least some embodiments, the telecommunications switch 407 may determine the call handling option additionally based on: a frequency of calls involving the caller ID; a time of receipt of the call setup signalling; trustworthiness of the carrier network (the carrier network 201 in this example) involved in routing of the call setup signalling; a signature verifying the caller ID included in the call setup signalling; an indication that handling of the call setup signalling involves a call server from a list of prohibited servers; a geographical location associated with the caller ID; a previously received indication of a nuisance call involving the caller ID; signalling route information included in the call setup signalling; and/or an average duration for calls involving the caller ID. In examples, the previously received indication regarding nuisance calls may be from the called party 111, other caller parties, and/or a party acting on behalf of one or more called parties.

In at least some embodiments, the call handling options include routing the call setup signalling based on a called party identifier, for example an identifier corresponding to the called party 111, included in the call setup signalling, whereby causing a call to be established based on the call setup signalling. The call handling options additionally include blocking the call setup signalling, whereby preventing a call to be established based thereon. The telecommunications switch 407 may alternatively transmit the call setup signalling for receipt by a telecom node (not shown) configured to screen nuisance calls. The telecom node may, for example, conduct further checks in relation to the call setup signalling before making a determination as regards the call handling option.

Figure 4:
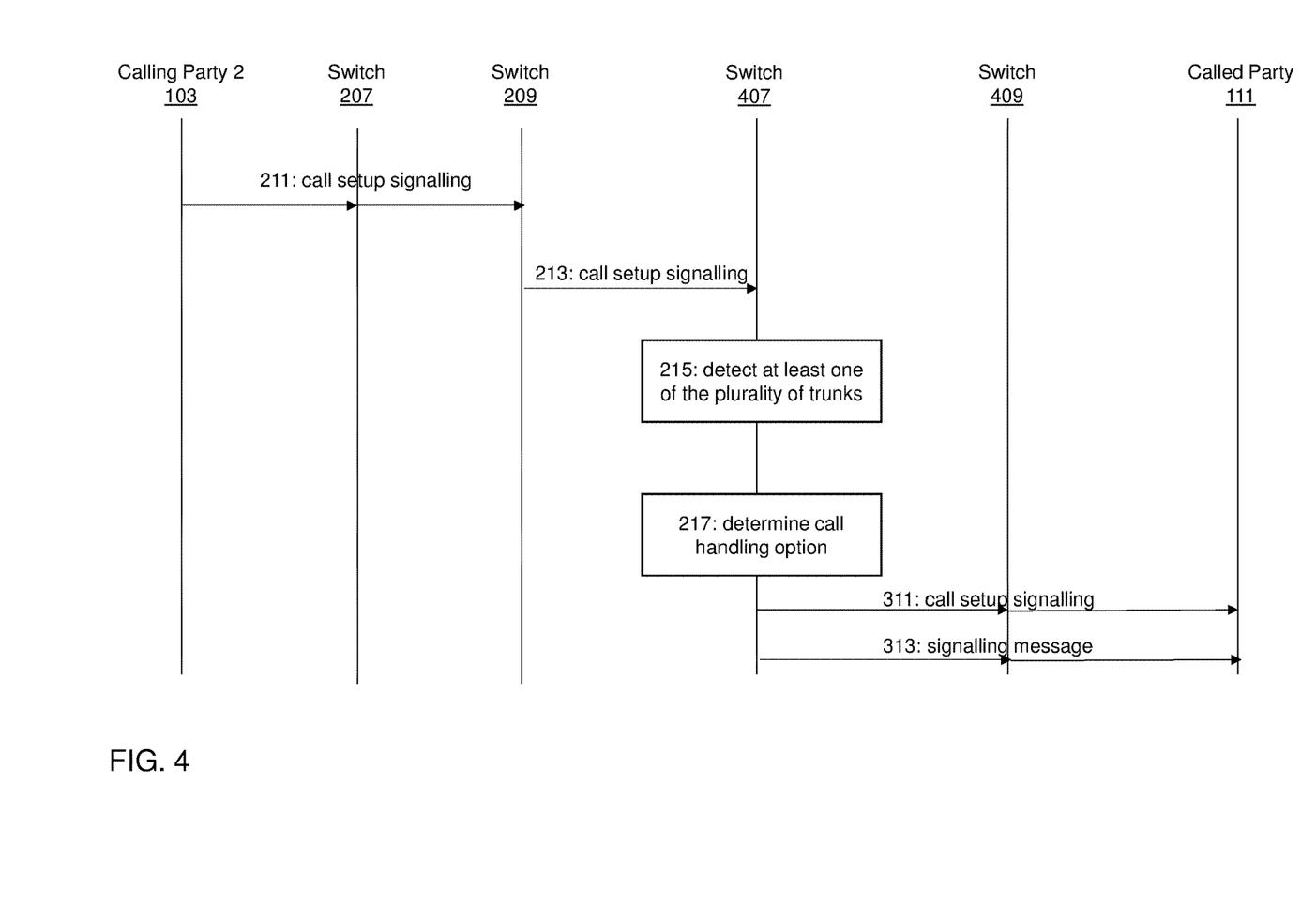
FIG. 4 shows a flow diagram depicting another example of processing data in accordance with embodiments.

Referring to FIG. 4, there is shown an example of handling of call setup signalling originating at the calling party 103. This example is performed in the telecommunications network 100 described above with reference to FIG. 1.

In the event that the telecommunications switch 407 determines that the call setup signalling should be allowed in order to cause a call based on the call setup signalling to be established at item 217, the telecommunications switch 407 switch transmits the call setup signalling based on an identifier associated with the called party 111 included in the call setup signalling (item 311). The telecommunications switch 407 may additionally transmit a signalling message comprising data based at least in part the combination of the detection at item 215 and the determination at item 217 (item 313). This may particularly, but not exclusively, be the case if the detected trunk, via which the call setup signalling has arrived at the telecommunications switch 407 at item 213, is indicative of a trunk that is not associated with any of the trunk(s) in the white list or the blacklist. The signalling message at 313 may be comprised within the call setup signalling transmitted at item 311, and could, for example, be a flag.

The called party equipment 111 may display data based on the signalling message in conjunction with an indication of an incoming call, thereby enabling a user of the equipment associated with the called party 111 to decide whether or not to answer the incoming call. The user could, for example, make an informed decision and decide not to answer the incoming call if it is likely to relate to a nuisance call. The signalling message may be transmitted in-band, i.e. by including the contents thereof in the call setup signalling transmitted at item 311, or out-of-band, i.e. by transmitting it separately to the call setup signalling transmitted at item 311.

In embodiments, the detected trunk, via which the call setup signalling has arrived at the telecommunications switch 407 at item 213, is indicative of at least a part of the signalling route traversed by the call setup signalling.

In embodiments, at least one of the trunks 501, 503 and 507 is detected at item 215 on the basis of a port of the telecommunications switch 407 via which the call setup signalling is received at item 213.

Therefore, embodiments provide an improved mechanism for identifying nuisance calls, and that is not reliant on the capabilities of carrier networks on the traversed signalling route. In addition, embodiments do not rely on a blacklist of called party identifiers, which are prone to cause preventing both genuine and illegitimate use of a called party identifier that has been subject to caller ID spoofing. By contrast, embodiments enable the telecommunications switch 407 to determine a call handling option based on the trunk detected locally at the switch, and as a consequence is independent of any external influences or misleading information that may be included by an untrustworthy network involved in routing call setup signalling.

The above are to be understood as illustrative examples. Further examples are envisaged.

In examples described above, the telecommunications network 100 comprises two calling parties 101 and 103, three carrier networks 201, 301 and 401 and one called party 111. In other examples, the communications network 100 comprises more calling and called parties and/or additional carrier networks.

In the examples described above, each the carrier networks 201, 301 and 401 comprise 4 telecommunication switches 203, 205, 207, 209, 303, 305, 307, 309, 403, 405, 407 and 409 (as appropriate). In other examples, the carrier networks 201, 301 and 401 comprises additional or fewer network equipment.

Various measures (for example telecommunication switched, methods and computer programs) are provided for processing call setup signalling at a telecommunications switch. Call setup signalling comprising at least a caller ID is received at a telecommunication switch. The telecommunications switch is connected via a plurality of trunks to two or more other telecommunication switches capable of transmitting call setup signalling to the telecommunication switch. The telecommunication switch detects at least one of the plurality of trunks via which the call setup signalling has arrived at the telecommunications switch. The telecommunications switch determines a call handling option to be applied to the incoming call setup signalling based at least in part on the detecting and the caller ID. Therefore, the telecommunication switch is enabled to identify illegitimate use of a caller ID based on a technically less complex mechanism that does not rely on the capabilities of other carrier networks involved in routing the call setup signalling.

The at least one of the plurality of trunks, via which the call setup signalling has arrived at the telecommunications switch, may be detected independently of data included in the received call setup signalling. Therefore, the telecommunications switch is enabled to determine on a call handling option based on information detected locally at the telecommunications switch.

The detected at least one of the plurality of trunks, via which the call setup signalling has arrived at the telecommunications switch, may comprise: a trunking circuit; or a trunking group. Therefore, the telecommunications switch is enabled to identify trunking information in respect of telecommunication switches involved in routing call setup signalling.

The telecommunications switch may maintain, in a database, a first association between the caller ID and a first set comprising data indicative of at least one of the plurality of trunks, the at least one of the plurality of trunks associated with the first set being indicative of at least one signalling route that signalling originating from the caller ID can traverse. The telecommunications network determines the call handling option based at least in part on the first association. Therefore, the telecommunications switch maintains a list of legitimate signalling routes based on the plurality of trunks via which call setup signalling may be received for signalling involving the caller ID, and determines the call handling option based on the maintained list.

The telecommunications switch may maintain, in the database, a second association between the caller ID and a second set comprising data indicative of at least one further of the plurality of trunks, the at least one further of the plurality of trunks associated with the second set being different to the at least one of the plurality of trunks associated with the first set and the at least one further of the plurality of trunk associated with the second set being indicative of at least one signalling route that signalling originating from the caller ID could not have traversed. The telecommunications network determines the call handling option based at least in part on the second association. Therefore, the telecommunications switch maintains a list of illegitimate signalling routes based on the plurality of trunks via which call setup signalling may be received for signalling involving the caller ID, and determines the call handling option based on the maintained list.

The telecommunications switch, responsive to determining that the detected at least one of the plurality of trunks, via which the call setup signalling has arrived at the telecommunications switch, does not correspond with any of trunks associated with the first set and the second set, may monitor signalling involving the caller ID in order to determine if an association between the detected at least one of the plurality of trunks sand the caller ID should be maintained in the first set or the second set. Therefore, the telecommunications switch is enabled to identify new signalling routes for calls involving the caller ID, and update associations in the first and the second set accordingly.

The telecommunications switch may determine the call handling option at least in part based on: a frequency of calls involving the caller ID; a time of receipt of the call setup signalling; trustworthiness of a carrier network involved in routing the call setup signalling; a signature verifying the caller ID; an indication that handling of the call setup signalling involves a call server from a list of prohibited servers; a geographical location associated with the caller ID; a previously received indication of a nuisance call involving the caller ID; signalling route information included in the call setup signalling; and/or an average duration for calls involving the caller ID. Therefore, the telecommunications switch is enabled to consider additional factors when determining a call handling option.

The call handling option may comprise: routing the call setup signalling based on a called party identifier included in the call setup signalling, whereby causing a call to be established based on the call setup signalling; blocking the call setup signalling, whereby preventing a call to be established based on the call setup signalling; or transmitting the call setup signalling for receipt by a node configured to screen nuisance calls. Therefore, the telecommunications switch is enabled to select from a variety of call handling options.

The telecommunications switch may transmit a signalling message for receipt by a user terminal associated with a called party identifier associated with the call setup signalling comprising data based at least in part the combination of the detection and the determination. Therefore, the telecommunications switch is enabled to communicate result of the detection and the determination to a called party, whereby allowing the called party to make an informed decision regarding whether or not to answer a corresponding incoming call.

The at least one of the plurality of trunks may be detected on the basis of a port of the telecommunications switch via which the call setup signalling is received. Therefore, the telecommunications switch is enabled to determine at least a part of a signalling route traversed by the call setup signalling on the basis of the detected trunk via which the call setup signalling was received.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of processing call setup signalling at a telecommunications switch, the method comprising:
   receiving at said telecommunications switch a call setup signalling, comprising at least a caller ID, said telecommunications switch being connected via a plurality of trunks which connect the telecommunications switch to two or more other telecommunications switches capable of transmitting the call setup signalling to said telecommunications switch;
   maintaining, in a database, a first association between the caller ID and a first set comprising data indicative of at least one of the plurality of trunks, the at least one of the plurality of trunks associated with the first set being indicative of at least one signalling route that the call setup signalling originating from the caller ID can traverse;
   maintaining, in the database, a second association between the caller ID and a second set comprising data indicative of at least one further of the plurality of trunks, the at least one further of the plurality of trunks associated with the second set being different to the at least one of the plurality of trunks associated with the first set, the at least one further of the plurality of trunk associated with the second set being indicative of at least one signalling route that the call setup signalling originating from the caller ID could not have traversed;
   detecting at least one of the plurality of trunks via which the call setup signalling has arrived at said telecommunications switch;
   determining a call handling option to be applied to the call setup signalling based at least in part on the detecting and the caller ID; and
   responsive to determining that the detected at least one of the plurality of trunks, via which the call setup signalling has arrived at said telecommunications switch, does not correspond with any of trunks associated with the first set and the second set, monitoring signalling involving the caller ID in order to determine if an association between the detected at least one of the plurality of trunks and the caller ID should be maintained in the first set or the second set.

2. The method according to claim 1, wherein the detected at least one of the plurality of trunks, via which the call setup signalling has arrived at said telecommunications switch, is detected independently of data included in the received call setup signalling.

3. The method according to claim 1, wherein the detected at least one of the plurality of trunks, via which the call setup signalling has arrived at said telecommunications switch, comprises:
   a trunking circuit; or
   a trunking group.

4. The method according to claim 1, the method comprising determining the call handling option at least in part based on:
   a frequency of calls involving the caller ID;
   a time of receipt of the call setup signalling;
   trustworthiness of a network involved in routing the call setup signalling;
   a signature verifying the caller ID;
   an indication that handling of the call setup signalling involves a call server from a list of prohibited servers;
   a geographical location associated with the caller ID;
   a previously received indication of a nuisance call involving the caller ID; signalling route information included in the call setup signalling; and/or an average duration for calls involving the caller ID.

5. The method according to claim 1, wherein the call handling option comprises:
   routing the call setup signalling based on a called party identifier included in the call setup signalling, whereby causing a call to be established based on the call setup signalling;
   blocking the call setup signalling, whereby preventing a call to be established based on the call setup signalling; or
   transmitting the call setup signalling for receipt by a node configured to screen nuisance calls.

6. The method according to claim 1, wherein the method comprises: transmitting a signalling message for receipt by a user terminal associated with a called party identifier associated with the call setup signalling comprising data based at least in part combination of the detection and the determination.

7. The method according to claim 1, wherein the at least one of the plurality of trunks is detected on the basis of a port of the telecommunications switch via which the call setup signalling is received.

8. A telecommunications switch comprising:
   at least one processor;
   and at least one memory including computer program code; the at least one memory and the computer program code being configured to, with the at least one processor, cause the telecommunications switch to:
   receive a call setup signalling, comprising at least a caller ID, said telecommunications switch being connected via a plurality of trunks which connect the telecommunications switch to two or more other telecommunications switches capable of transmitting the call setup signalling to said telecommunications switch;
   maintain, in a database, a first association between the caller ID and a first set comprising data indicative of at least one of the plurality of trunks, the at least one of the plurality of trunks associated with the first set being indicative of at least one signalling route that the call setup signalling originating from the caller ID can traverse;
   maintain, in the database, a second association between the caller ID and a second set comprising data indicative of at least one further of the plurality of trunks, the at least one further of the plurality of trunks associated with the second set being different to the at least one of the plurality of trunks associated with the first set, the at least one further of the plurality of trunk associated with the second set being indicative of at least one signalling route that the call setup signalling originating from the caller ID could not have traversed;

detect at least one of the plurality of trunks via which the call setup signalling has arrived at said telecommunications switch;

determine a call handling option to be applied to the call setup signalling based at least in part on the detecting and the caller ID; and responsive to determining that the detected at least one of the plurality of trunks, via which the call setup signalling has arrived at said telecommunications switch, does not correspond with any of trunks associated with the first set and the second set, monitoring signalling involving the caller ID in order to determine if an association between the detected at least one of the plurality of trunks and the caller ID should be maintained in the first set or the second set.

9. The telecommunications switch according to claim 8, wherein the detected at least one of the plurality of trunks, via which the call setup signalling has arrived at said telecommunications switch, is detected independently of data included in the received call setup signalling.

10. The telecommunications switch according to claim 8, wherein the detected at least one of the plurality of trunks, via which the call setup signalling has arrived at said telecommunications switch, comprises:
   a trunking circuit; or
   a trunking group.

11. The telecommunications switch according to claim 8, wherein the telecommunications switch is configured to:
   determine the call handling option at least in part based on:
      a frequency of calls involving the caller ID;
      a time of receipt of the call setup signalling;
      trustworthiness of a network involved in routing the call setup signalling;
      a signature verifying the caller ID;
      an indication that handling of the call setup signalling involves a call server from a list of prohibited servers;
      a geographical location associated with the caller ID;
      a previously received indication of a nuisance call involving the caller ID;
      signalling route information included in the call setup signalling; and/or an average duration for calls involving the caller ID.

12. The telecommunications switch according to claim 8, wherein the call handling option comprises:
   route the call setup signalling based on a called party identifier included in the call setup signalling, whereby causing a call to be established based on the call setup signalling;
   block the call setup signalling, whereby preventing a call to be established based on the call setup signalling; or
   transmit the call setup signalling to a node configured to screen nuisance calls.

13. The telecommunications switch according to claim 8, wherein the telecommunications switch is configured to: transmit a signalling message for receipt by a user terminal associated with a called party identifier associated with the call setup signalling comprising data based at least in part a combination of the detection and the determination.

14. A non-transitory computer-readable storage medium comprising a set of computer-readable instructions stored thereon, which, when executed by a processing system, cause the processing system to carry out a method of processing call setup signalling at a telecommunications switch, the method comprising, at the processing system:
   receiving at said telecommunications switch call setup signalling, comprising at least a caller ID, said telecommunications switch being connected via a plurality of trunks which connect the telecommunications switch to two or more other telecommunications switches capable of transmitting call setup signalling to said telecommunications switch;
   detecting at least one of the plurality of trunks via which the call setup signalling has arrived at said telecommunications switch; and
   determining a call handling option to be applied to the incoming call setup signalling based at least in part on the detecting and the caller ID.

* * * * *